(No Model.) 6 Sheets—Sheet 1.

G. J. SCOTT.
SYSTEM OF ELECTRICAL DISTRIBUTION.

No. 562,924. Patented June 30, 1896.

Fig. 1.

Witnesses.
Jno. G. Hinkel
William E. Neff

Inventor.
Gordon J. Scott
by Watson & Watson
Attorneys (No Model.) 6 Sheets—Sheet 2.

G. J. SCOTT.
SYSTEM OF ELECTRICAL DISTRIBUTION.

No. 562,924. Patented June 30, 1896.

Witnesses. Inventor.
Gordon J. Scott
by Watson & Watson
Attorneys (No Model.) 6 Sheets—Sheet 3.

G. J. SCOTT.
SYSTEM OF ELECTRICAL DISTRIBUTION.

No. 562,924. Patented June 30, 1896.

Fig. 4.

Witnesses
Jno G Hinkel
William E. Neff

Inventor
Gordon J. Scott
by Watson & Watson
Attorneys (No Model.)  6 Sheets—Sheet 4.

G. J. SCOTT.
SYSTEM OF ELECTRICAL DISTRIBUTION.

No. 562,924. Patented June 30, 1896.

Fig. 5.

Witnesses
Jno. G. Hinkel
William E. Neff

Inventor
Gordon J. Scott
by Watson & Watson
Attorneys (No Model.)

G. J. SCOTT.
SYSTEM OF ELECTRICAL DISTRIBUTION.

No. 562,924. Patented June 30, 1896.

(No Model.)

G. J. SCOTT.
SYSTEM OF ELECTRICAL DISTRIBUTION.

No. 562,924.  Patented June 30, 1896.

Fig. 8.

UNITED STATES PATENT OFFICE.

GORDON J. SCOTT, OF PHILADELPHIA, PENNSYLVANIA.

SYSTEM OF ELECTRICAL DISTRIBUTION.

SPECIFICATION forming part of Letters Patent No. 562,924, dated June 30, 1896.

Application filed January 3, 1896. Serial No. 574,263. (No model.)

*To all whom it may concern:*

Be it known that I, GORDON J. SCOTT, a citizen of the United States, residing at Philadelphia, in the county of Philadelphia and State of Pennsylvania, have invented certain new and useful Improvements in Systems of Electrical Distribution, of which the following is a specification.

My invention relates to an improved system of transmission, distribution, and regulation of electric currents and to improvements in apparatus employed in connection therewith.

In practicing the invention I transmit a single-phase alternating current through any desired number of independent circuits consecutively and without commutation.

The principal application of the invention which I contemplate is to set up in an alternating-current motor a rotary electric and magnetic field, and in the following specification as a convenient illustration I shall describe the invention as thus applied. For convenience I shall term the circuits in which the currents are induced "motor-circuits," although, as will be evident, they may be used as light-circuits in cases where it is desirable to vary the intensity of electric lights, and for various other purposes.

A leading feature of the invention is that I am able to control absolutely the rate at which the current is directed from one circuit to another and the order of succession in which it passes through the several circuits. In the illustration adopted this enables me to operate the motor either forward or backward and at any desired speed and to start and stop it at will.

The apparatus of my invention I have termed an "induction-director." This apparatus consists, broadly stated, in a primary ring or rings through which the current from the generator passes, a secondary ring or rings in parallel inductive relation to the primary ring or rings, a motor circuit or circuits connected to said secondary ring or rings, by fixed or movable connections, and means for varying at will the electromotive force and current in said motor circuit or circuits. The electromotive force in the motor-circuits is usually controlled or varied by movement or rotation of the points of greatest difference of potential in the secondary ring or rings relatively to the points of connection of said motor-circuits with said secondary ring or rings. This may be accomplished in different ways, several of which I will illustrate and describe hereinafter.

By the term "parallel inductive relation" which I use in this specification I mean a relation of the primary rings, coils, or circuits to the secondary rings, coils, or circuits in which said primary and secondary members, or parts thereof, are mechanically parallel and electrically in inductive relation. It is a leading feature of my induction-director that when either member is movable its coils or rings move in the direction of their length and always remain in parallel relation to the coils or rings of the other member.

In the accompanying drawings, in which like reference-signs refer to similar parts throughout the several views.

Figure 1:
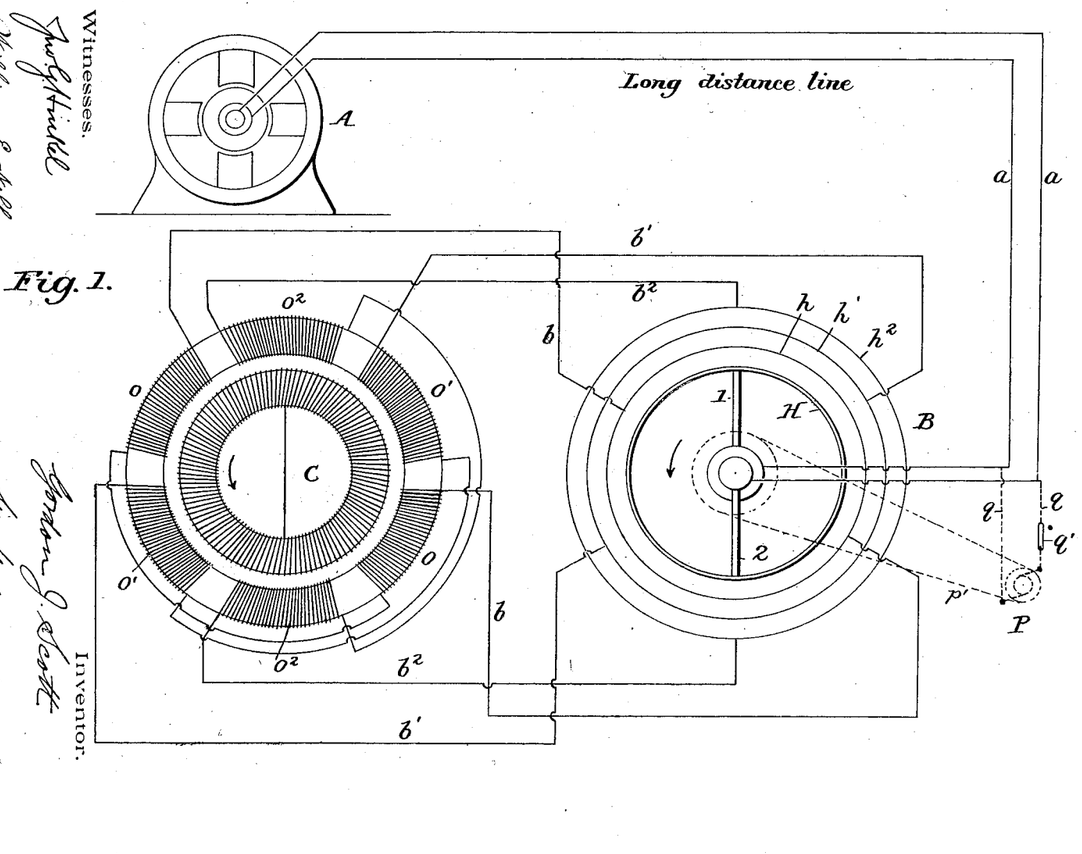
Figure 1 is a diagram illustrating a system of electrical distribution according to my invention.

Referring to Fig. 1, A indicates a single-phase alternating-current generator, B the induction-director, and C the motor. The single-phase circuit $a$ is connected to the induction-director in a manner to be hereinafter explained, and the induction-director is connected with the motor by motor-circuits $b$ $b'$ $b^2$. As shown, the circuits $b$ $b'$ $b^2$ are field-circuits, but it will be evident that they may be either field or armature circuits so far as the present invention is concerned, and I shall call them simply "motor-circuits."

Figure 2:
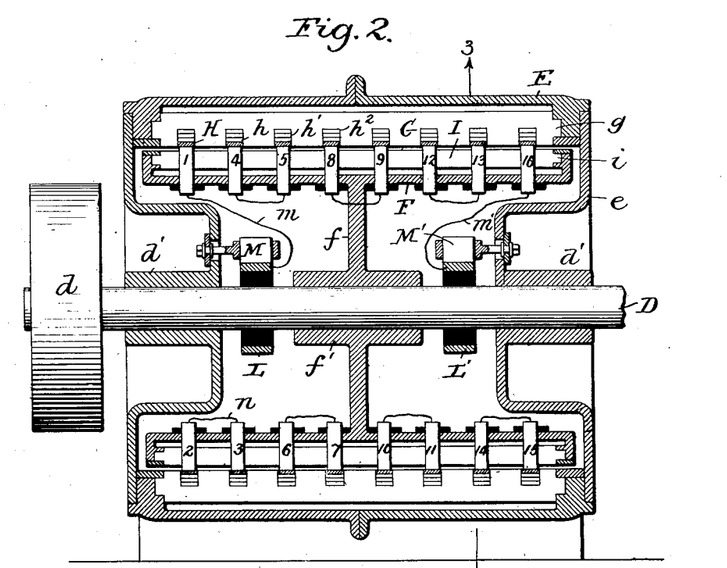
Fig. 2 is a longitudinal central section of one form of the induction-director.
Figure 3:
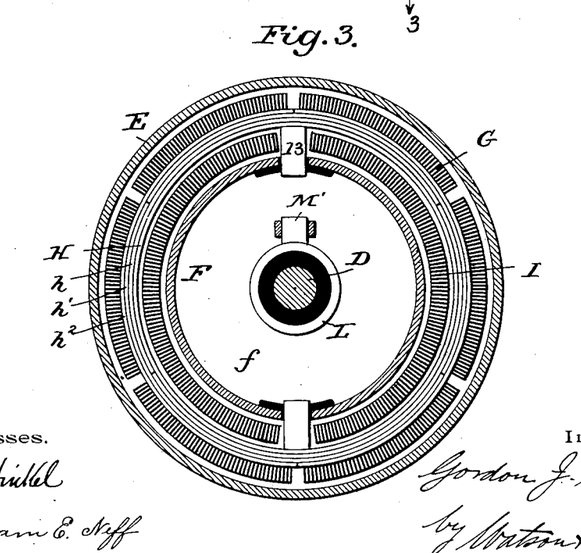
Fig. 3 is a transverse section on the line 3 3 of Fig. 2.

Referring to Figs. 2 and 3, which illustrate the induction-director, D indicates a shaft mounted in suitable bearings $d'$ in the ends $e$ of a drum-like frame E, and having a pulley d. Within the frame is a revolving cylinder F, carried by suitable arms f and a hub f upon the shaft. Surrounding the cylinder F is a fixed circular laminated core G, composed of plates which, as shown, are supported in the ends of the drum by tenons g. In the inner faces of the plates G are notches in which are embedded a series of copper coils or rings, the inner rings H being continuous, or closed, while the outer rings $h \, h' \, h^2$ are preferably continuous when solid, and made in two sections when composed of coils of wire. The several rings are insulated from each other. On the periphery of the rotatable cylinder F is a circular series of iron plates, forming a core I, supported in the ends of the cylinder by tenons i, the core I being arranged close to the stationary core G of the drum. At diametrically opposite sides of the cylinder are longitudinal rows of brushes, which are arranged, respectively, opposite to, and constantly in direct contact with, the closed or primary rings H. These rows of brushes are indicated by the numbers 1 4 5, &c., and 2 3 6, &c., respectively, the reference-figures upon the brushes indicating the order in which the current passes through them, as will be presently explained. Upon the shaft D are insulated rings L and L', and in contact with these rings are stationary brushes M M', to which are connected the terminals of the alternating circuit a.

The internal circuits of the induction-director are as follows: The current entering through the brush M passes to ring L and thence through wire m to the brush 1, where it divides and passes in opposite directions around the ring H to the brush 2, (see Fig. 2) thence through wire n to the brush 3 and then around second ring H in opposite directions to brush 4. Similarly the brushes in each of the rows are connected in pairs, and the current passes in opposite directions around each pair of adjacent rings until it reaches the last brush, which, in the illustration, is numbered 16. In other words, the rings H are connected in series. They may, however, be connected in multiple if desired. From brush 16 the current passes to the ring L' and back to the line through brush M'. It will be seen that the direction of the currents being opposite in adjacent rings H will set up alternate north and south poles throughout the laminated cores G. The movable core I is arranged close to the stationary core G in order to complete the magnetic circuits around the rings. The sets of secondary rings $h \, h' \, h^2$, respectively, may be connected together in series or in multiple, and the motor-circuits are connected to the terminals of the sets.

In Fig. 1 the primary rings H and the secondary rings $h, h', h^2$ are represented diagrammatically, and a single pair of brushes 1 2 are likewise illustrated. As shown in this figure, the terminals of the motor-circuit b are connected to the inner secondary ring h at diametrically opposite points, and the circuit includes opposite coils o of the field-magnet. Likewise the terminals of the motor-circuits $b' \, b^2$ are connected to the rings $h' \, h^2$, and the circuits include the opposite field-coils $o'$ and $o^2$ of the motor, respectively. The several motor-circuits are connected at equidistant points with respect to the circumference of the rings.

Figure 5:
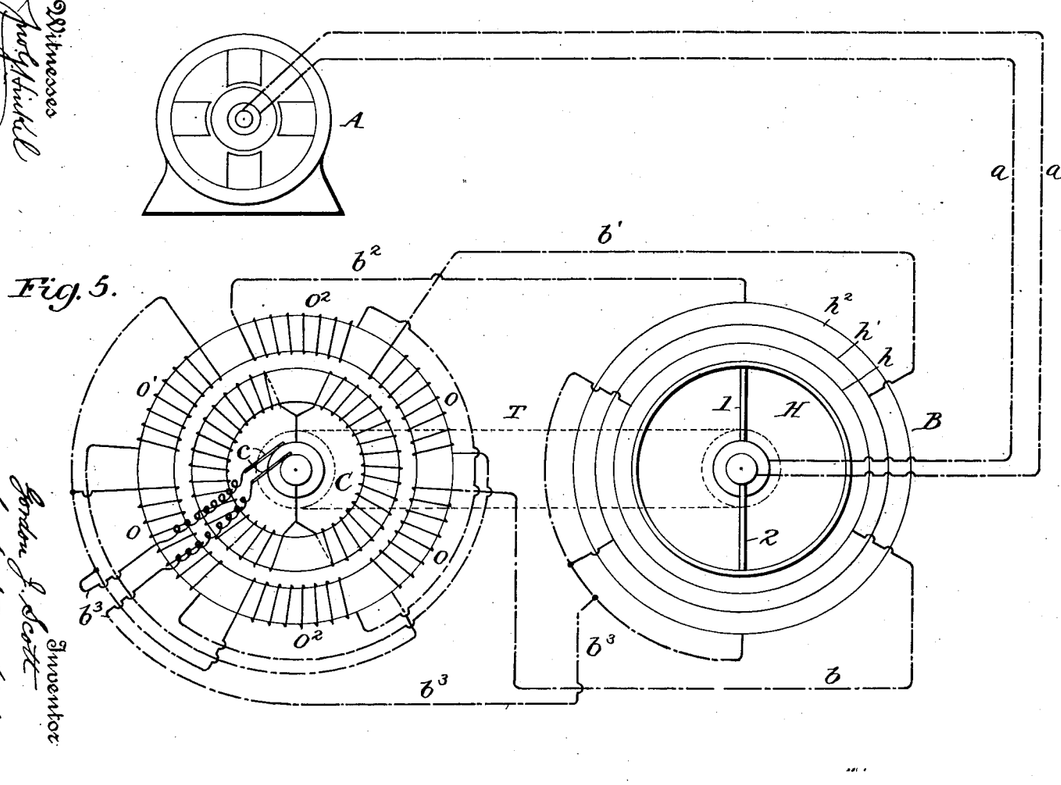
Fig. 5 is a diagram illustrating a system in which the induction-director is coupled mechanically with one of the motors.

Suitable means are provided for turning or moving the shaft of the induction-director. For some purposes, as for instance in operating rock-drills, it might be desirable to rock the shaft instead of giving it continuous rotation; but ordinarily it will be desirable to rotate the brushes of the induction-director by some means under easy control. This may be done by a hand-crank, or, as shown in Fig. 1, by an independent motor P, which is included in a branch circuit q, provided with a switch q'. The motor may be connected to the induction-director by a belt p or other suitable means. In Fig. 5 I have illustrated a combined induction-director and motor so arranged that the former is driven by the latter, as will be described in detail hereinafter.

The operation of the induction-director above described is as follows: The current passing in opposite directions through the rings H will set up strong induced currents in the secondary rings. The points of greatest difference of potential in the secondary rings will always be opposite the brushes, and the points of least difference of potential will be at right angles to the brushes, while diametrically opposite points in other parts of the rings will have a difference of potential varying with their proximity to the line of the brushes. It will thus be understood that with the brushes and connections as shown in Fig. 1 the coils $o^2$ in the motor-circuit $b^2$ will be strongly energized, while the coils o and o' in the circuits b and b' will be less active, all of the coils tending to set up poles of opposite polarity at points midway between the coils $o^2$. The rotation of the brushes, it will be readily seen, will rotate the points of maximum and minimum potential in the secondary rings, and the motor-circuits will be energized in rotation and a rotary field be set up in the motor. It will therefore be seen that in order to regulate the speed and direction of the revolving part of the motor it is simply necessary to regulate the speed and direction of the induction-director, as the motor will run synchronously with it.

The currents set up in the motor-circuits gradually rise from nil to a maximum and then gradually fall, and may be aptly called "waves of current" and "electromotive force" or "electrical energy." This wave action of my induction-director is a feature which distinguishes it from machines having a like object in view and in which the current is shifted from one circuit to another by means of commutators, switches, or other make-and-break devices. In such machines the current is switched into and out of the motor-circuits at full strength and much sparking inevitably results.

Figure 4:
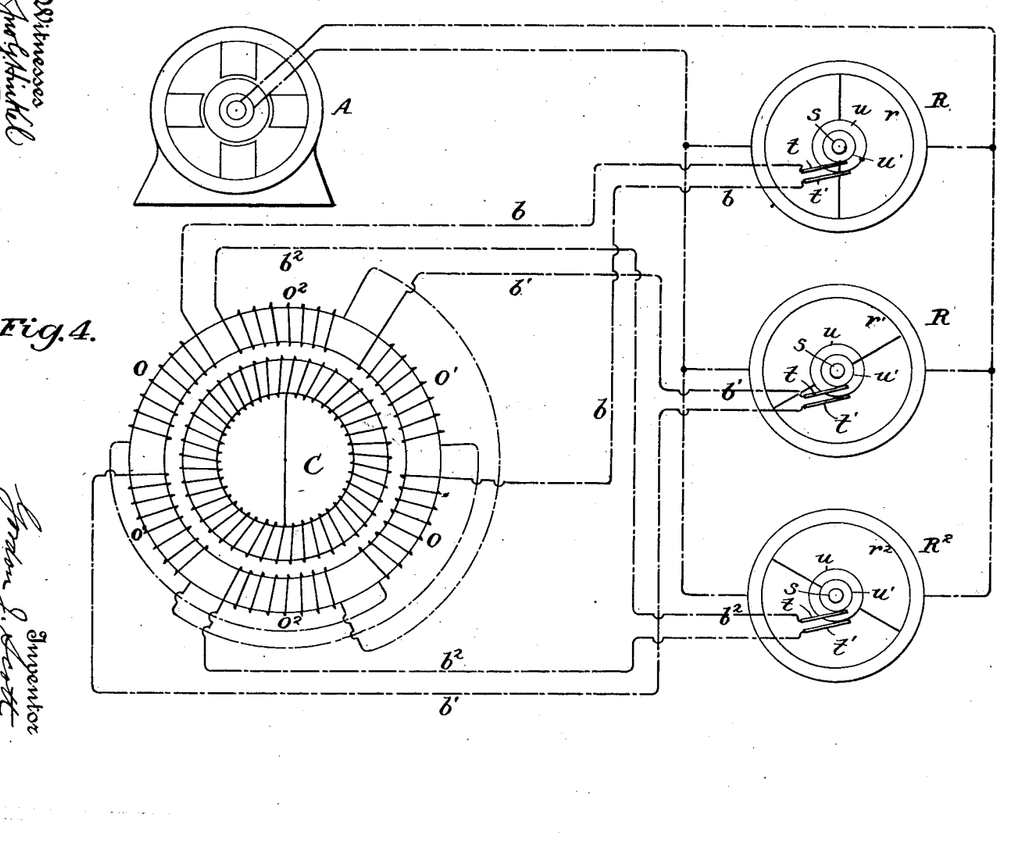
Fig. 4 is a diagram of a system of distribution similar to that shown in Fig. 1, but illustrating a modification of the induction-director.

In Fig. 4 is shown in diagram a modification of the induction-director. The generator, generator-circuit, motor, and motor-circuits in this figure are the same as those in Fig. 1 and a detailed description of these portions of Fig. 4 may therefore be omitted. The induction-director is, however, in its arrangement the reverse of that shown in Fig. 1. The outer rings or coils R R' R² are the primary members and the inner rings $r$ $r'$ $r^2$ are the secondary members. Although shown separately on the diagram the several members R R', &c., are designed to be mounted upon a common shaft S. The primary members are arranged in series or multiple in the circuit $a$. For each secondary member there is a pair of brushes $t$ $t'$, which connect the terminals of the motor-circuits through the secondary rings. As shown, the brushes $t$ $t'$ are connected to insulated rings $u$ $u'$, from which the current is taken by the motor-circuits.

The operation of the apparatus shown in Fig. 4, in so far as it differs from that shown in Fig. 1, is as follows: The line-wire A is connected to the several primary rings at diametrically opposite points, and the current divides and passes through the opposite halves of each ring, thus setting up in the secondary rings points of greatest difference of potential opposite the points where the line-wire is connected to the primary members. As the brushes in contact with any secondary member rotate, the current and electromotive force in the corresponding motor-circuit will rise and fall, being greatest when the brushes are in line with the points of maximum and minimum potential in the secondary member, and gradually increase and decrease as they approach and recede from those points. The brushes of the several motor-circuits are equally spaced about the shaft of the induction-director and a rotary electric and magnetic field is thus set up in the motor C, the speed of rotation of which is in fixed relation with the speed of the induction-director.

It will be seen that the modification shown in Fig. 4 is the reverse of that shown in Fig. 1. In Fig. 1 the points of greatest difference of potential are made to rotate in the primary and secondary rings, while the terminals or points of connection with the motor-circuits to the secondary rings are stationary. In Fig. 4 the points of greatest difference of potential are stationary in the primary and secondary rings while the points of connection of the motor-circuits with the secondary rings, that is the terminals of the brushes, are made to rotate.

In Fig. 5 I have shown an arrangement in which the induction-director is driven by the motor C. For the purposes of this illustration the generator and the induction-director may be considered the same in construction as those shown in Fig. 1. The coils on the rotary field of the motor C are similar to those shown in Fig. 1, but the motor-circuits $b$ $b'$ $b^2$ have a common return-wire $b^3$, which includes the armature of the motor, the return-circuit being connected to the brushes $c$. In other words, the armature is in series with the field.

The armature of the motor C and the brushes of the induction-director are connected mechanically, and the induction-director is driven by the motor at any desired speed, the necessary speed depending upon the particular constructions of motor and induction-director employed. As shown, this is accomplished by connecting them together by means of a belt T. It will be evident that this may be accomplished in various ways, as by placing the motor and induction-director upon a common shaft, or connecting them by means of a chain belt or other suitable gearing.

The operation is as follows: Assuming the parts in the position shown, the coils $o^2$ are strongly energized. This will create resultant north and south poles in the field midway between said coils. At this instant the line of the armature-poles is at right angles to the line of the field-poles and the armature will begin to rotate. The armature carries with it the brushes of the induction-director and a rotary field is thus set up in the motor, the poles of which are constantly ninety degrees, or any other desired amount, in advance or in the rear of the poles of the armature. As the brush 1 moves to the left the coil $o'$ becomes more strongly energized, and after it is moved through an arc of thirty degrees the coils $o^2$ and $o'$ will be equally energized and the current in the coil $o$ will be nil. At this instant the resultant poles of the field will be in the middle of the coils $o$ and the poles of the armature will be ninety degrees from the field-poles. As the brush 1 continues to move to the left the current in the coil $o'$ will increase and that in the coil $o^2$ will decrease, and when the brushes reach a position sixty degrees from the vertical the coils $o'$ will be energized a maximum amount and the coils $o$ and $o^2$ will be energized equally, the conditions being the same as when the brushes are vertical. The motor and induction-director, as shown in Fig. 5, constitute a load-starting non-synchronous machine which is adapted to be operated on a single-phase alternating-current circuit.

Figure 6:
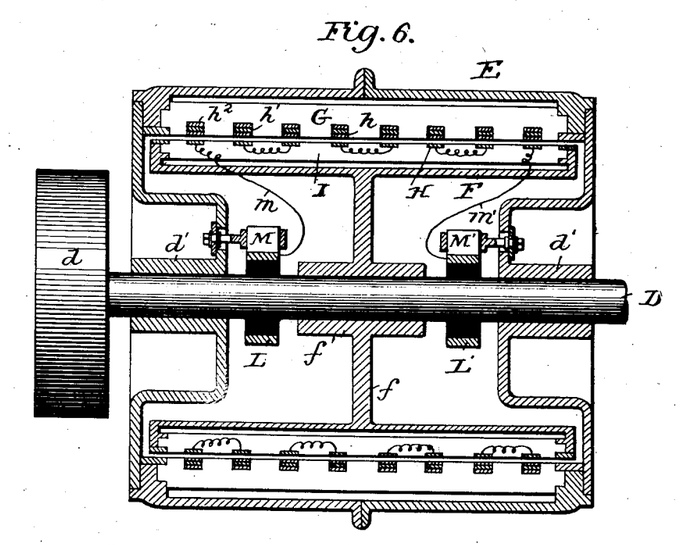
Figs. 6 and 7 are sectional views similar to Figs. 2 and 3, illustrating an induction-director of modified construction.
Figure 7:
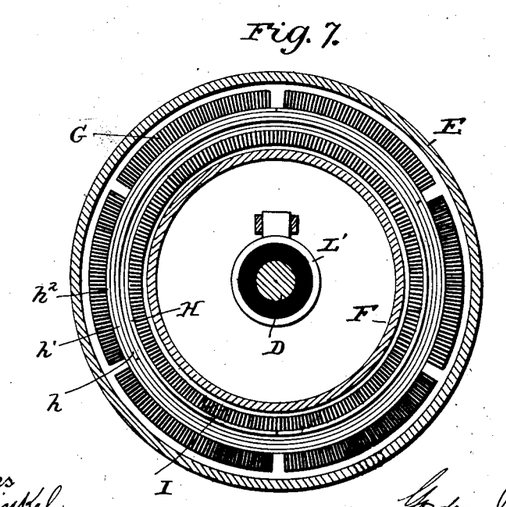

In Figs. 6 and 7 I have illustrated a form of the induction-director which differs from that illustrated in Figs. 2 and 3 in that the primary rings or coils are movable relatively to the secondary rings or coils and the brushes are dispensed with. In these figures the primary rings H are embedded in the core I of the rotating cylinder F while the secondary rings $h$ $h'$ $h^2$ are embedded in the core G of the stationary drum. The primary rings H may be connected in series just as the brushes are connected in the form shown in Fig. 2, and the end rings or coils are connected to the line-circuit of the generator through the brushes M M' and conductors m m'.

In operation the primary rings are rotated in close proximity to the inner secondary rings and the points of greatest difference of potential in said secondary rings are simultaneously rotated. The motor-circuits are connected to the secondary rings, as shown in Fig. 1, and the current rises and falls in the several motor-circuits successively as the cylinder F rotates, thus creating a rotary field in the motor.

Figure 8:
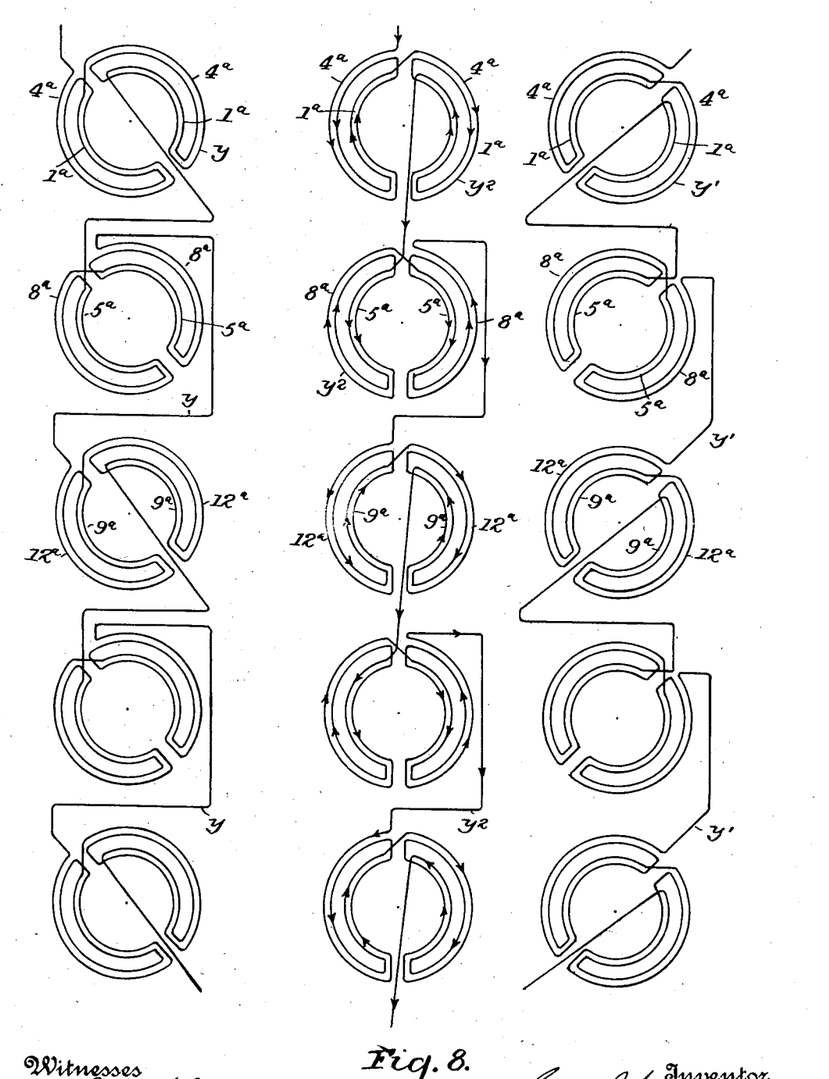
Fig. 8 is a diagram illustrating an arrangement of coils which may be used in lieu of the secondary rings $h$ $h'$ $h^2$.

In Fig. 8 I have shown in diagram an arrangement of coils adapted to be used in the induction-directors illustrated in Figs. 2 and 6 in lieu of the secondary rings $h\ h'\ h^2$. I shall designate the internal circuits corresponding to these several rings, respectively, as $y\ y'\ y^2$. The wire is laid in circular recesses of the core G corresponding to the recesses in which the rings are shown embedded in Fig. 2, and I have designated the several coils which are placed in the recesses corresponding to the brushes 1 4 5, &c., by the reference-signs $1^a\ 4^a\ 5^a$, &c., respectively.

Referring particularly to the circuit $y^2$, the actual method of winding, which it is rather difficult to illustrate by diagram, is as follows: Applying the diagram of this circuit to the machine shown in Fig. 2, the two semicircular coils are placed in the recesses corresponding to the brushes 1 and 4, the wires running in one direction in each coil, and designated by $1^a$, being placed in the recess opposite brush 1, and the return-wires of the coils (designated $4^a$) being placed in the recess opposite the brush 4. These coils are connected together to the next succeeding coils $5^a$ and $8^a$. The coils $5^a$ and $8^a$ are placed in the recesses corresponding to the brushes 5 and 8 and likewise connected together and to the succeeding coils of the series. The coils of the circuits $y$ and $y'$ are connected similarly to the coils of the circuit $y^2$ and are arranged in the same recesses, the coils being insulated from each other. The dividing-lines of the semicircular coils of the several circuits are spaced about the induction-director angularly, corresponding to the points at which the motor-circuits are connected with the rings shown in Figs. 1 and 5, so that the internal circuits $y\ y'\ y^2$ are energized successively. These circuits are connected with the motor-circuits $b\ b'\ b^2$, either as shown in Fig. 1 or Fig. 5 or in any other desired manner. The disposition of the coils of the internal circuits $y\ y'\ y^2$ should be such as to present the greatest possible length of wire parallel to the primary rings or coils and with the least possible length at right angles to said primary rings or coils, and all of the rings or coils should lie in planes at right angles to the axis of the induction-director.

The principle of the induction-director may be otherwise stated as consisting in moving the points of greatest difference of potential in the secondary coils or rings relatively to the terminals of the motor-circuits, thus creating in the motor-circuits a gradual rise and fall of current and electromotive force. It will be evident that this may be accomplished by various means, many of which may differ widely, both mechanically and electrically, from those herein described for the purpose of illustration.

It will also be understood that instead of connecting the field-circuits to the secondary rings, as shown, the rotary effect may be accomplished by connecting up the armature-circuits in the same manner. In other words, the circuits of either the field or armature, or both, may be acted upon by the induction-director. Likewise, it will be obvious that in the induction-director either the cylinder F or the drum E, or both, may be rotated. It is, however, preferable from a mechanical point of view to rotate the inner portion or cylinder F.

Without, therefore, limiting myself to the precise construction and arrangement of parts illustrated and described, I claim—

1. In a system of electric-power transmission, an induction-director for inductively transmitting a single-phase alternating current through a plurality of circuits in succession, consisting of secondary coils included in said circuits, a primary coil or coils in parallel inductive relation to said secondary coils, and movable means for gradually increasing and then decreasing the electromotive force and current in said circuits whereby waves of electrical energy are sent through them successively, substantially as described.

2. In a system of electric-power transmission, an induction-director for inductively transmitting a single-phase alternating current through any desired number of circuits in succession, consisting of secondary coils, to different points of which the terminals of the circuits are connected, a primary coil or coils in parallel inductive relation to said secondary coils, and means for moving the points of greatest difference of potential in the secondary coils relatively to the terminals of the circuits, whereby waves of electrical energy are sent successively through said circuits, substantially as described.

3. In a system of electric-power transmission, a single-phase alternating-current circuit, a motor having a plurality of motor-circuits, and an induction-director for inductively transmitting a single-phase current successively through said motor-circuits, said induction-director consisting of secondary coils, to opposite points of which the terminals of the motor-circuits are connected, a primary coil or coils in parallel inductive relation to said secondary coils and to opposite points of which the line-circuit is connected, and means for moving the points of greatest difference of potential in the secondary coils relatively to the terminals of the motor-circuits, whereby waves of electrical energy are sent successively through said motor-circuits, substantially as described.

4. In a system of electric-power transmission, a single-phase alternating-current circuit, a motor having a plurality of motor-circuits, and an induction-director consisting of circular secondary rings or coils to diametrically opposite points of which the terminals of the motor-circuits are connected, primary rings or coils in parallel inductive relation to the secondaries and having the line-circuit connected thereto at diametrically opposite points, and means for rotating the points of greatest difference of potential in the secondary coils relatively to the terminals of the motor-circuits, whereby waves of electrical energy are sent successively through said motor-circuits, substantially as described.

5. In combination, a primary inducing ring or member, a single-phase alternating-current circuit connected to opposite points of said primary member, a secondary ring or member in parallel inductive relation to said primary member, a circuit through which the induced current of the secondary member passes, the terminals of said circuit being connected to opposite points of the secondary ring or member, and means for moving or rotating said terminals or points of connection relatively to the points of greatest difference of potential in said secondary ring, substantially as described.

6. In combination, a primary or inducing ring or member included in a single-phase alternating-current circuit, a secondary ring or member in inductive relation to said primary member, a circuit having its terminals connected to opposite points of said secondary member, and means for mechanically moving the points of greatest difference of potential in said secondary member, substantially as described.

7. An induction-director for single-phase alternating currents, consisting of two rings or coils in parallel inductive relation, brushes constantly in direct contact with one of said rings and movable relatively thereto, the single-phase alternating line-circuit being connected through the brushes and the ring in contact with said brushes, and a circuit having its terminals connected to opposite points of the other ring, or vice versa, substantially as described.

8. An induction-director for single-phase alternating currents having a closed primary ring or coil, brushes movable relatively to and constantly in direct contact with said ring at opposite points, a secondary ring or coil in parallel inductive relation to said primary ring, and a circuit having its terminals connected to said secondary ring or coil, the relative movement of said primary ring and brushes varying the induced current in said circuit, substantially as described.

9. An induction-director having a closed primary ring or coil, relatively-movable brushes constantly in direct contact with said ring at opposite points, a series of secondary rings or coils in parallel inductive relation to said primary ring, and a corresponding series of motor-circuits having their terminals connected to the respective secondary rings at opposite points, substantially as described.

10. An induction-director having a closed primary ring or coil, relatively-movable brushes constantly in direct contact with said ring at opposite points, a series of secondary rings in parallel inductive relation to said primary ring, a laminated core in which said rings are embedded, and a series of motor-circuits corresponding in number to and having their terminals connected with said secondary rings at opposite points, substantially as described.

11. An induction-director having a series of closed primary rings or coils, a series of relatively-movable brushes constantly in direct contact with said rings at opposite points, a series of secondary rings respectively in parallel inductive relation to said primary rings, and a corresponding series of closed motor-circuits including said secondary rings, substantially as described.

12. An induction-director having a series of closed primary rings or coils, a corresponding series of movable brushes constantly in direct contact with said rings at opposite points, a series of secondary rings or coils in inductive relation to said primary rings, a laminated core in which all of said rings are embedded, connections to the brushes whereby the current is passed through adjacent rings in opposite directions, and motor-circuits connected to said secondary rings, substantially as described.

13. An induction-director for single-phase alternating currents, consisting of a frame carrying fixed primary and secondary rings or coils in parallel inductive relation, a shaft mounted in the frame, brushes carried by the shaft and constantly in direct contact with the primary rings, means for rotating the shaft, and internal circuits whereby the current may be passed through the brushes and the primary rings, substantially as described.

14. An induction-director consisting of the frame or drum E provided with the laminated core G, the primary rings H and secondary rings $h$, $h'$, &c., in combination with the shaft D mounted in bearings in the frame, the cylinder F carried by the shaft, the core I and the brushes carried by the cylinder, the insulated rings upon the shaft, the fixed brushes on the drum, and the electrical connection between the insulated rings and the brushes of the primary rings, substantially as described.

15. The combination with an alternating-current motor having a series of independent circuits, of an induction-director having a corresponding series of secondary rings or coils to which the terminals of said motor-circuits are connected, primary rings or coils in parallel inductive relation to said secondary coils, a single-phase alternating circuit connected to opposite points of said primary coils, and mechanical connections between the movable member of the motor and the movable member of the induction-director, substantially as described.

16. The combination with a motor having a series of field-circuits, of an induction-director having a corresponding series of secondary rings or coils, the terminals of each field-circuit being connected to opposite points of its respective coil, a primary ring or coil in parallel inductive relation to the secondary coils, a pair of movable brushes connected to a single-phase alternating circuit and in constant contact with the primary ring or coil, and mechanical connections from the armature of the motor for rotating the brushes of the induction-director, substantially as described.

In testimony whereof I affix my signature in presence of two witnesses.

GORDON J. SCOTT.

Witnesses:
J. A. WATSON,
WILLIAM E. NEFF.